US010446379B1

(12) United States Patent
Wiederin

(10) Patent No.: US 10,446,379 B1
(45) Date of Patent: Oct. 15, 2019

(54) INTERIOR TEXTURING AND SELF-ALIGNING CONNECTOR SYSTEM FOR A SPRAY CHAMBER

(71) Applicant: Elemental Scientific, Inc., Omaha, NE (US)

(72) Inventor: Daniel R. Wiederin, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 67 days.

(21) Appl. No.: 15/442,010

(22) Filed: Feb. 24, 2017

Related U.S. Application Data

(60) Provisional application No. 62/300,182, filed on Feb. 26, 2016.

(51) Int. Cl.

| | |
|---|---|
| ***H01J 49/04*** | (2006.01) |
| ***B01D 45/12*** | (2006.01) |
| ***B01D 45/08*** | (2006.01) |
| ***H01J 49/16*** | (2006.01) |
| ***F16L 21/00*** | (2006.01) |
| *B04C 3/06* | (2006.01) |

(52) U.S. Cl.
CPC .......... *H01J 49/0422* (2013.01); *B01D 45/08* (2013.01); *B01D 45/12* (2013.01); *F16L 21/002* (2013.01); *H01J 49/0409* (2013.01); *H01J 49/16* (2013.01); *B04C 3/06* (2013.01)

(58) Field of Classification Search
None
See application file for complete search history.

(56) References Cited

U.S. PATENT DOCUMENTS 5,315,369 A * 5/1994 Zadgorska ............. G01N 21/73 356/315
5,578,157 A * 11/1996 Higdon .............. G01N 30/6039 156/278
8,679,235 B1 * 3/2014 Wiederin ............. G01N 1/2211 55/322
2008/0250765 A1 * 10/2008 Lane ...................... B01D 45/06 55/495

OTHER PUBLICATIONS https://web.archive.org/web/20080609032834/http://www2.dupont.com/Products/en_RU/Teflon_and_Tefzel_FLUOROPOLYMERS_en.html.*

* cited by examiner

*Primary Examiner* — James Choi
(74) *Attorney, Agent, or Firm* — Kevin E. West; Advent, LLP

(57) ABSTRACT

A spray chamber is disclosed, wherein the spray chamber includes textured interior portions (e.g., textured inner walls and/or textured surfaces of one or more components within the spray chamber) to prevent droplets from building up on interior surfaces of the chamber as such build up can result in poor measurement performance. Wettability is improved by texturing one or more of the interior surfaces, and as a result, the interior surfaces can shed moisture more easily, thereby preventing droplet buildup. A connector system is also disclosed to provide self-aligned coupling between an exit port of a spray chamber and an input tube of an injector. The connector system allows the spray chamber to be quickly and accurately coupled to the injector by simple mating of the two components.

16 Claims, 3 Drawing Sheets

INTERIOR TEXTURING AND SELF-ALIGNING CONNECTOR SYSTEM FOR A SPRAY CHAMBER

CROSS-REFERENCE TO RELATED APPLICATIONS

The present application claims the benefit under 35 U.S.C. § 119(e) of U.S. Provisional Application Ser. No. 62/300,182, filed Feb. 26, 2016, and titled "INTERIOR TEXTURING AND SELF-ALIGNING CONNECTOR SYSTEM FOR A SPRAY CHAMBER," which is incorporated herein by reference in its entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. Prior or during transportation of the aliquot to the nebulizer, the sample aliquot may be mixed with hydride generation reagents and fed into a hydride gas/liquid separator that channels hydride and/or sample gas into the nebulizer. The aerosol generated by the nebulizer is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

A spray chamber is disclosed, wherein the spray chamber includes textured interior portions (e.g., textured inner walls and/or textured surfaces of one or more components within the spray chamber) to prevent droplets from building up on interior surfaces of the chamber as such build up can result in poor measurement performance. Wettability is improved by texturing one or more of the interior surfaces, and as a result, the interior surfaces can shed moisture more easily, thereby preventing droplet buildup. A connector system is also disclosed to provide self-aligned coupling between an exit port of a spray chamber and an input tube of an injector. The connector system allows the spray chamber to be quickly and accurately coupled to the injector by simple mating of the two components.

In an embodiment, a spray chamber comprises a chamber formed from a glass material (e.g., glass, quartz, or the like). The spray chamber includes a baffle inside the chamber and an exit port outside the chamber, the exit port being connected to the baffle. The exit port is connectable to an injector. The baffle and the exit port are also formed from the glass material, and the baffle and the exit port can have textured inner surfaces for improved wettability. For example, the inner surfaces of the exit port and the baffle can be "frosted" or otherwise textured by abrasion or etching. In some embodiments, the interior of the chamber itself also has a textured inner surface (e.g., spanning some or all of the interior walls of the chamber). The textured surfaces can be formed by physical abrasion (e.g., sand blasting), chemical abrasion, laser etching, or the like. The spray chamber can also include an input port extending outwards from the chamber. The input port may be connectable with a nebulizer, and can also have a textured interior surface in some embodiments. A drainage port within the chamber can receive and remove (e.g., drain out) waste droplets from the chamber (e.g., moisture shed off of interior surfaces of the chamber, baffle, exit port, input port, etc.).

In an embodiment, a spray chamber includes a first sleeve formed around an end of an exit port of the spray chamber. The first sleeve can extend beyond the end of the exit port to receive an input tube of an injector. The inner diameter of the exit port may be equal to the inner diameter of the input tube of the injector to allow the exit port and the input tube to be lined up with one another, end-to-end, forming a fluid path having a uniform inner diameter at the interface of the two components. A second sleeve can be formed around the input tube of the injector, and the first sleeve can be structured to fit within the second sleeve such that the second sleeve surrounds the first sleeve when the input tube is inserted within the first sleeve. In some embodiments, the rim thickness of the first sleeve can be nearly equal to the distance, radially, between an outer surface of the input tube and an inner surface of the second sleeve. Thus, the first sleeve can fit tightly in between the input tube and the second sleeve when the exit port of the spray chamber and the input tube of the injector are mated together. This also allows the two components to self-align with one another. The connector sleeves may be formed form perfluoroalkoxy alkane (PFA) or another copolymer or plastic material.

In some embodiments, a copolymer ridge (e.g., PFA ridge or one formed from another copolymer or plastic material) is disposed at the mateable end of the exit port or at the mateable end of the input tube (or both) to form connection interface between the exit port and the input tube when the input tube is inserted within the first sleeve. This prevents direct contact between glass material (e.g., glass or quartz) making up the exit port and input tube, which can potentially result in damage to one or both of the components or leakage because of poor sealing at the interface. The ridge between the glass pieces allows them to be mated (i.e., in the case that the spray chamber and injector are separable) without substantially disrupting the gas flow pattern to avoid deposition of solids materials at the transition between the spray chamber and the injector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
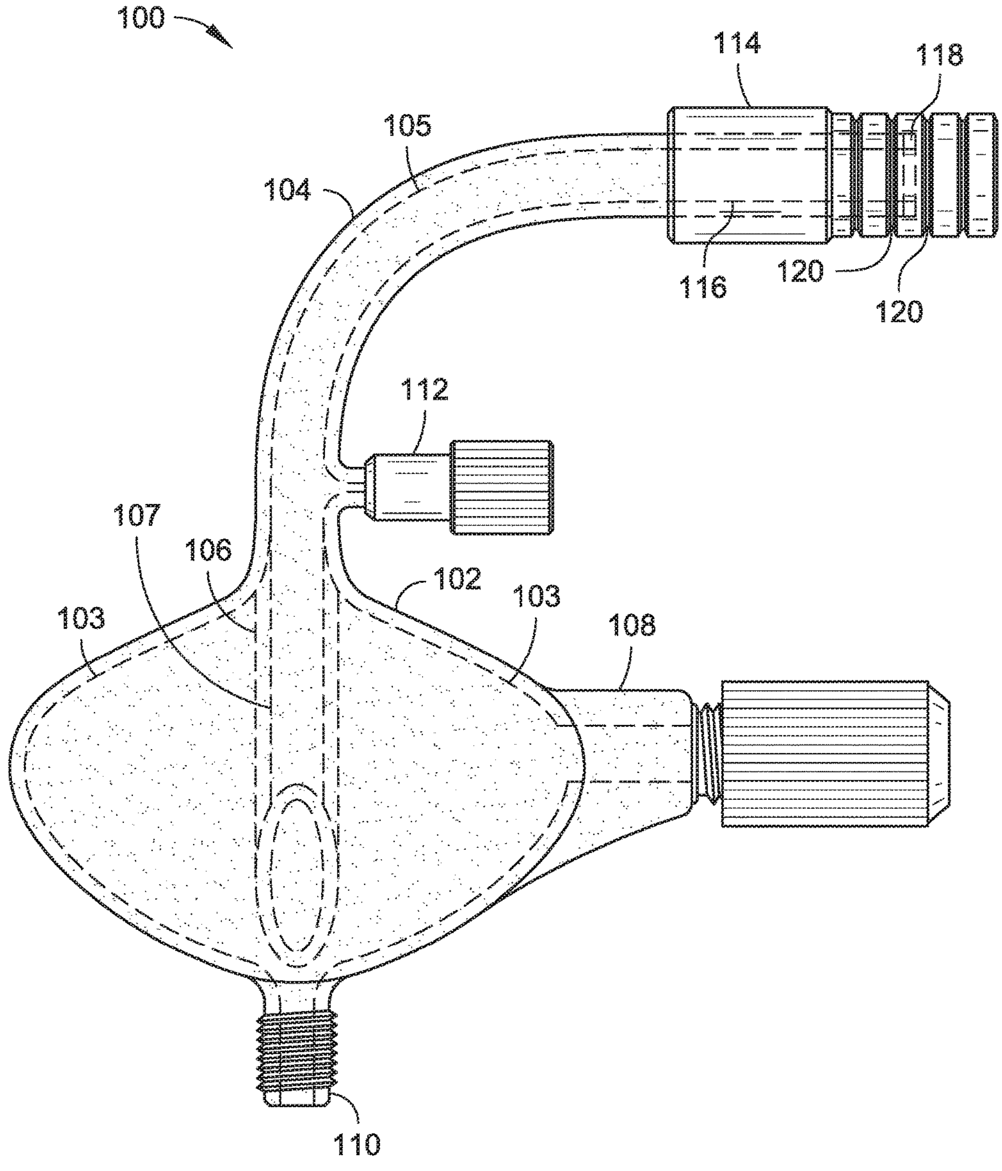
FIG. 1 is a schematic side view of a spray chamber implemented in accordance with an embodiment of this disclosure.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. Prior or during transportation of the aliquot to the nebulizer, the sample aliquot may be mixed with hydride generation reagents and fed into a hydride gas/liquid separator that channels hydride and/or sample gas into the nebulizer. The aerosol generated by the nebulizer is then sorted in a spray chamber to remove the larger aerosol particles. Upon leaving the spray chamber, the aerosol is introduced into the plasma by a plasma torch assembly of the ICP-MS or ICP-AES instruments for analysis.

Moisture introduced by the nebulizer can cause droplets to build up on inner walls or inner structures of the spray chamber. This type of buildup can result in poor measurement performance. Some embodiments of this disclosure include a spray chamber having textured interior portions (e.g., textured inner walls and/or textured surfaces of one or more components within the spray chamber) to prevent droplets from building up on interior surfaces of the chamber. Wettability is improved by texturing (e.g., frosting or patterning) one or more of the interior surfaces, and as a result, the interior surfaces can shed moisture more easily, thereby preventing droplet buildup.

A connector system is also disclosed to provide self-aligned coupling between an exit port of a spray chamber and an input tube of an injector. The connector system allows the spray chamber to be quickly and accurately coupled to the injector by simple mating of the two components.

Example Implementations

FIGS. 1 through 4 illustrate a spray chamber 100 and an injector 200 in accordance with various embodiments of this disclosure. Those skilled in the art will appreciate that the embodiments illustrated in the drawings and/or described herein may be modified or fully or partially combined to result in additional embodiments. Accordingly, the illustrated and described embodiments should be understood as explanatory and not as limitations of the present disclosure.

Looking now to FIG. 1, a spray chamber 100 is shown in accordance with an embodiment of this disclosure. The spray chamber 100 comprises a chamber 102 formed from a glass material (e.g., glass or quartz, or the like). The spray chamber 100 includes a baffle 106 inside the chamber 102 and an exit port 104 outside the chamber 102. The exit port 104 is connected to the baffle 106. For example, the exit port 104 and the baffle 106 can be portions of a continuous tube extending from outside the chamber 102 to the inside of the chamber 102. The exit port 106 is connectable to an injector, such as injector 200 shown in FIG. 2 (described in further detail below). In some embodiments, the exit port 106 also includes an inlet 112 for a gas addition line (e.g., to inject gas with the sample substance flowing through the exit port 106).

The baffle 106 and the exit port 104 may also be formed from the glass material and can be portions of an integrated structure including the chamber 102 and possibly other portions of the spray chamber 100, such as an input port 108 and a drainage port 110. For example, some or all portions of the spray chamber 100 can comprise a single integrated structure formed of glass, quartz, or other glass material. The spray chamber 100 can also include an input port 108 extending outwards from the chamber 102. The input port 108 may be connectable with a nebulizer. The spray chamber 100 can also include a drainage port 110 within the chamber 102 to receive and remove (e.g., drain out) waste droplets from the chamber 100 (e.g., moisture shed off of interior surfaces of the chamber 102, baffle 106, exit port 104, input port 108, etc.).

One or more interior portions of the spray chamber 100 can have textured surfaces for improved wettability. For example, some or all inner surfaces (e.g., surfaces 103, 105, and/or 107) of the chamber 102, exit port 104, baffle 106, input port 108, and so forth can be "frosted" or otherwise textured by abrasion or etching so that moisture (e.g., liquid droplets) are more easily shed from these surfaces and removed from the chamber 102 via the drainage port 110. In implementations, the textured surfaces (e.g., surfaces 103, 105, and/or 107) may be formed by physical abrasion (e.g., sand blasting), chemical abrasion, laser etching, or the like.

Figure 2:
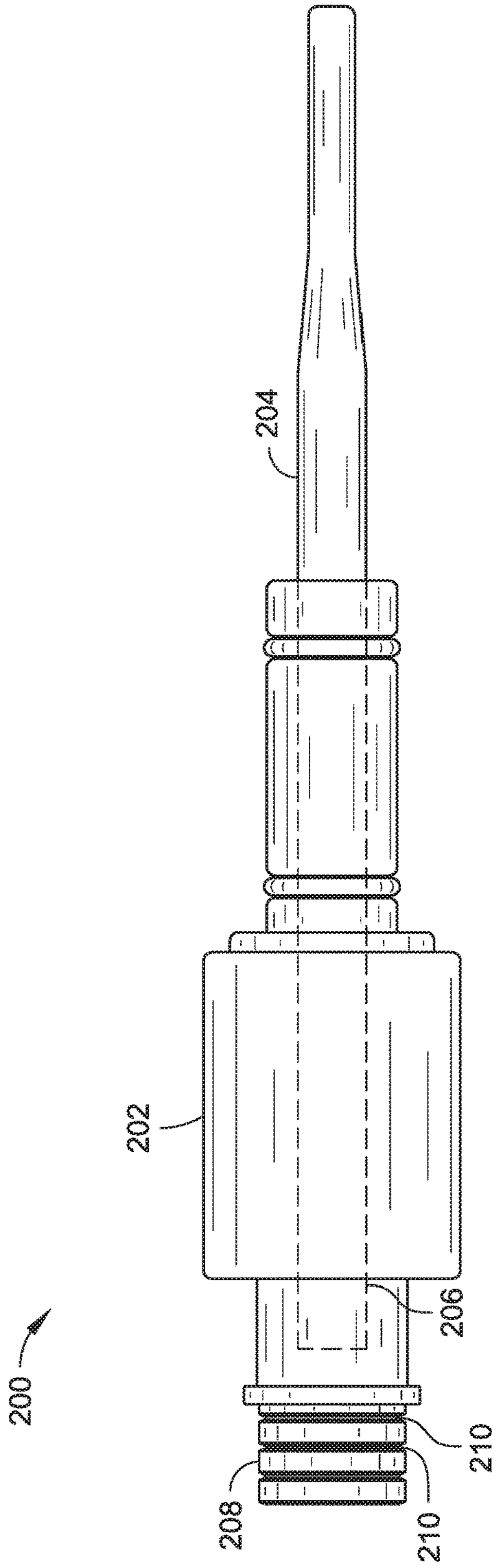
FIG. 2 is a schematic side view of an injector implemented in accordance with an embodiment of this disclosure.
Figure 3:
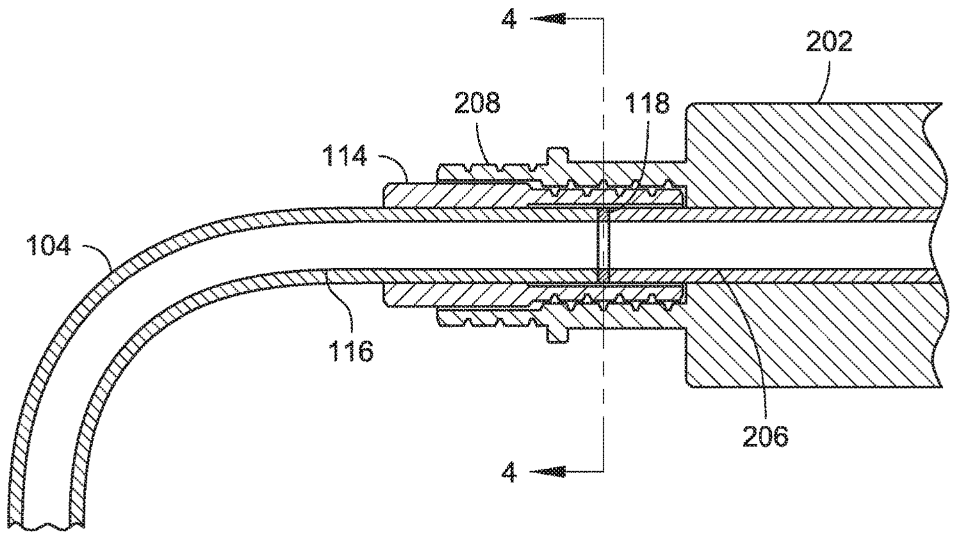
FIG. 3 is a cross-sectional side view of a connector system for coupling the spray chamber with the injector, implemented in accordance with an embodiment of this disclosure.

In an embodiment, the spray chamber 100 includes a sleeve 114 formed around an end 116 of the exit port 104. Sleeve 114 can extend beyond the end 116 of the exit port 104 to receive an input tube 206 of an injector 200. As shown in FIG. 2, the injector 200 can include a body 202 having an output tube and/or nozzle 204 at one end for releasing sample substances received from the spray chamber 100 into an ICP instrument (e.g., into an ICP torch assembly). The body 202 can have an input tube 206 at the other end for connecting to the spray chamber 100. The inner diameter at end 116 of exit port 104 may be equal to the inner diameter of the input tube 206 of the injector 200 to allow the exit port 104 and the input tube 206 to be lined up with one another, end-to-end, forming a fluid path having a uniform inner diameter at the interface of the two components (e.g., as shown in FIG. 3).

The injector 200 can also have a sleeve 208 can be formed around the input tube 206, and sleeves 114 and 208 can be structured such that sleeve 114 fits within sleeve 208. That is, sleeve 208 surrounds sleeve 114 when the input tube 206 is inserted within sleeve 114. In some embodiments, the rim thickness of sleeve 114 can be nearly equal to the distance, radially, between an outer surface of the input tube 206 and an inner surface of sleeve 208. In this regard, sleeve 114 is configured to fit tightly in between the input tube 206 and sleeve 208 when the exit port 104 of the spray chamber 100 and the input tube 206 of the injector 200 are mated together. This also allows the two components to self-align with one another and mate by simply being pressed together. In some embodiments, one or more ridges or grooves 120 are formed on an exterior of sleeve 114, and one or more ridges or grooves 210 are formed on an interior of sleeve 208 to provide a frictional coupling between sleeve 114 and sleeve 208. In embodiments, sleeves 114 and 208 may be formed form perfluoroalkoxy alkane (PFA) or another copolymer or plastic material. Further, it is contemplated that the sleeve configuration with respect to the chamber 100 and the injector 200 may be reversed in some embodiments, for example, the end 116 of the exit port 104 may have a sleeve similar to sleeve 208, and the input tube 206 of the injector 200 may have a sleeve similar to sleeve 114.

Figure 4:
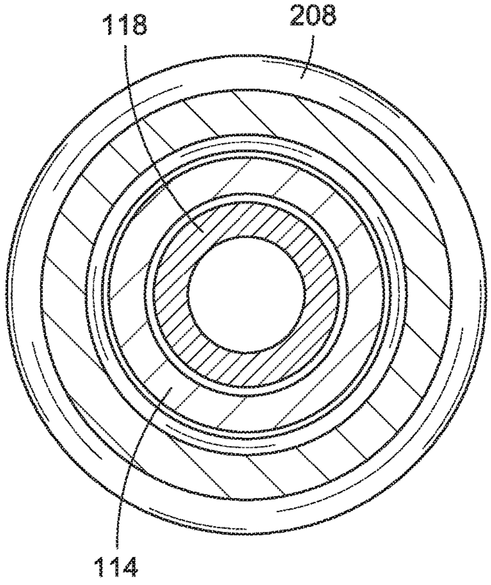
FIG. 4 is a cross-sectional end view of a connection interface between an exit port of the spray chamber and an input tube of the injector, implemented in accordance with an embodiment of this disclosure.

In some embodiments, a copolymer ridge 118 (e.g., PFA ridge or one formed from another copolymer or plastic material) is disposed at the mateable end 116 of the exit port or at the mateable end of the input tube 206 (or both) to form a connection interface between the exit port 104 and the input tube 206 when the input tube 206 is inserted within sleeve 114. This configuration prevents direct contact between glass material making up the exit port 104 and input tube 206, which can potentially result in damage to one or both of the components or leakage because of poor sealing at the interface. The ridge 118 between the glass pieces (tubes 116 and 206) allows them to be mated (i.e., in the case that the spray chamber 100 and injector 200 are separable as shown in the figures) without substantially disrupting the gas flow pattern to avoid deposition of solids materials at the transition between the spray chamber 100 and the injector 200. FIG. 4 shows an end view of this interface, where it is shown that the outer diameters of the ridge 118 (and tubes 116 and 206) are nearly equal to an inner diameter of sleeve 114, and the outer diameter of sleeve 114 is nearly equal to the inner diameter of sleeve 208.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A spray chamber for sorting an aerosol comprising:

a chamber formed from a glass material, wherein the chamber has a textured inner surface that spans substantially all interior portions of the chamber;

a baffle disposed inside the chamber, wherein the baffle is formed from the glass material, and wherein the baffle and the chamber cooperate to remove larger aerosol particles from the aerosol;

an exit port disposed outside the chamber, the exit port being connected to the baffle and being connectable to an injector of an inductively coupled plasma spectrometer, the exit port and the baffle forming portions of a smooth continuous tube, wherein the baffle and the exit port are formed from the glass material, and wherein the baffle and the exit port have textured inner surfaces;

an input port extending outwards from the chamber, the input port being connectable to a nebulizer, wherein the input port is formed from the glass material; and a drainage port within the chamber for removing waste droplets from the chamber, wherein the drainage port is formed from the glass material;

wherein the chamber, the baffle, the exit port, the input port and the drainage port form portions of an integrated structure molded from the glass material.

2. The spray chamber of claim 1, wherein an inner diameter of the exit port is equal to an inner diameter of an input tube of the injector.

3. The spray chamber of claim 2, further comprising: a first sleeve formed around an end of the exit port, the first sleeve extending beyond the end of the exit port to receive the input tube of the injector.

4. The spray chamber of claim 3, wherein the first sleeve is structured to fit within a second sleeve, the second sleeve being formed around the input tube of the injector such that the second sleeve surrounds the first sleeve when the input tube is inserted within the first sleeve.

5. The spray chamber of claim 3, further comprising: a copolymer ridge disposed at the end of the exit port to form a connection interface between the exit port and the input tube of the injector when the input tube is inserted within the first sleeve.

6. The spray chamber of claim 1, wherein the glass material comprises at least one of glass or quartz.

7. The spray chamber of claim 1, wherein the textured inner surfaces are formed by at least one of physical abrasion, chemical abrasion, or laser etching.

8. A spray chamber for sorting an aerosol comprising:

a chamber formed from a glass material, wherein the chamber has a textured inner surface that spans substantially all interior portions of the chamber;

a baffle disposed inside the chamber, wherein the baffle is formed from the glass material; and wherein the baffle and the chamber cooperate to remove larger aerosol particles from the aerosol;

an exit port disposed outside the chamber, the exit port being connected to the baffle and being connectable to an injector of an inductively coupled plasma spectrometer, the exit port and the baffle forming portions of a smooth continuous tube, wherein the baffle and the exit port are formed from the glass material, and wherein an inner diameter of the exit port is equal to an inner diameter of an input tube of the injector;

a first sleeve formed around an end of the exit port, the first sleeve extending beyond the end of the exit port to receive the input tube of the injector;

an input port extending outwards from the chamber, the input port being connectable to a nebulizer, wherein the input port is formed from the glass material; and a drainage port within the chamber for removing waste droplets from the chamber, wherein the drainage port is formed from the glass material;

wherein the chamber, the baffle, the exit port, the input port and the drainage port form portions of an integrated structure molded from the glass material.

9. The spray chamber of claim 8, wherein the first sleeve is structured to fit within a second sleeve, the second sleeve being formed around the input tube of the injector such that the second sleeve surrounds the first sleeve when the input tube is inserted within the first sleeve.

10. The spray chamber of claim 8, further comprising:

a copolymer ridge disposed at the end of the exit port to form a connection interface between the exit port and the input tube of the injector when the input tube is inserted within the first sleeve.

11. The spray chamber of claim 8, wherein the glass material comprises at least one of glass or quartz.

12. The spray chamber of claim 8, wherein the textured inner surface is formed by at least one of physical abrasion, chemical abrasion, or laser etching.

13. The spray chamber of claim 8, wherein the baffle and the exit port have textured inner surfaces.

14. Analysis instrumentation comprising:

an injector of an inductively coupled plasma spectrometer, having an input tube, wherein the injector is formed from a glass material;

a spray chamber formed from the glass material and configured for sorting an aerosol, wherein the spray chamber has a textured inner surface that spans substantially all interior portions of the spray chamber;

a baffle disposed inside the spray chamber, wherein the baffle is formed from the glass material, and wherein the baffle and the chamber cooperate to remove larger aerosol particles from the aerosol;

an exit port disposed outside the spray chamber, the exit port being connected to the baffle, the exit port and the baffle forming portions of a smooth continuous tube, wherein the injector, the baffle and the exit port have textured inner surfaces, and wherein an inner diameter of the exit port is equal to the inner diameter of the input tube of the injector, wherein the exit port is formed from the glass material;

a first sleeve formed around an end of the exit port, the first sleeve extending beyond the end of the exit port to receive the input tube of the injector; and a drainage port within the chamber for removing waste droplets from the chamber, wherein the drainage port is formed from the glass material;

wherein the chamber, the baffle, the exit port, the input port and the drainage port form portions of an integrated structure molded from the glass material.

15. The analysis instrumentation of claim 14, wherein the first sleeve is structured to fit within a second sleeve, the second sleeve being formed around the input tube of the injector such that the second sleeve surrounds the first sleeve when the input tube is inserted within the first sleeve.

16. The analysis instrumentation of claim 14, further comprising: a copolymer ridge that forms a connection interface between the exit port and the input tube when the input tube is inserted within the first sleeve.

* * * * *